United States Patent
Kang et al.

(10) Patent No.: US 10,827,318 B2
(45) Date of Patent: Nov. 3, 2020

(54) METHOD FOR PROVIDING EMERGENCY SERVICE, ELECTRONIC DEVICE THEREFOR, AND COMPUTER READABLE RECORDING MEDIUM

(71) Applicant: Samsung Electronics Co., Ltd., Suwon-si (KR)

(72) Inventors: Su-Jung Kang, Suwon-si (KR); Sang-Bum Kim, Suwon-si (KR); Ju-Ho Lee, Suwon-si (KR); Jae-Hyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/339,283

(22) PCT Filed: Sep. 26, 2017

(86) PCT No.: PCT/KR2017/010579
§ 371 (c)(1),
(2) Date: Apr. 3, 2019

(87) PCT Pub. No.: WO2018/066859
PCT Pub. Date: Apr. 12, 2018

(65) Prior Publication Data
US 2020/0053518 A1 Feb. 13, 2020

(30) Foreign Application Priority Data
Oct. 5, 2016 (KR) .......................... 10-2016-0128589

(51) Int. Cl.
*H04W 4/90* (2018.01)
*H04W 4/12* (2009.01)
(Continued)

(52) U.S. Cl.
CPC .............. *H04W 4/12* (2013.01); *G06Q 50/10* (2013.01); *H04L 51/046* (2013.01); *H04W 4/90* (2018.02); *H04W 76/50* (2018.02)

(58) Field of Classification Search
CPC .............. H04N 21/4345; H04N 21/814; G06F 17/2765; G08B 27/001; H04W 4/90;
(Continued)

(56) References Cited

U.S. PATENT DOCUMENTS

| 2008/0111705 A1 | 5/2008 | Lee |
| 2011/0037590 A1* | 2/2011 | Kannan ............... G08B 27/005 340/539.13 |

(Continued)

FOREIGN PATENT DOCUMENTS

| JP | 2009-290679 A | 12/2009 |
| KR | 10-0800812 B1 | 2/2008 |

(Continued)

OTHER PUBLICATIONS

European Patent Office, "Supplementary European Search Report," Application No. EP17858654.1, dated Jul. 23, 2019, 31 pages.

(Continued)

*Primary Examiner* — Phuoc H Doan

(57) ABSTRACT

Disclosed is a 5G or pre-5G communication system for supporting a data transmission rate higher than that of a 4G communication system such as LTE, ultra-reliability and low latency, and large-scale device communication. A method for providing an emergency service according to one embodiment of the present disclosure comprises the steps of: receiving an emergency message; analyzing the received emergency message and extracting emergency-related information therefrom; acquiring emergency notification content, which corresponds to the extracted emergency-related information, among a plurality of emergency notification con- (Continued)

tents pre-stored in an electronic device; and providing the acquired emergency notification content. In addition, other embodiments are possible in the present disclosure.

12 Claims, 13 Drawing Sheets

(51) Int. Cl.
*H04W 76/50* (2018.01)
*G06Q 50/10* (2012.01)
*H04L 12/58* (2006.01)

(58) Field of Classification Search
CPC ......... H04W 4/029; H04W 4/12; H04W 8/20; H04L 12/40; H04L 12/2801; H03H 7/48; H01F 38/14; H02G 3/36
USPC ...... 705/14.64; 340/531; 725/33; 455/404.1, 455/567
See application file for complete search history.

(56) References Cited

U.S. PATENT DOCUMENTS

| | | |
|---|---|---|
| 2013/0208712 A1 | 8/2013 | Lee et al. |
| 2013/0281047 A1 | 10/2013 | Daly et al. |
| 2016/0148100 A1 | 5/2016 | Chang et al. |

FOREIGN PATENT DOCUMENTS

| | | |
|---|---|---|
| KR | 10-2013-0091936 A | 8/2013 |
| KR | 10-2015-0022237 A | 3/2015 |
| KR | 10-2015-0085757 A | 7/2015 |
| KR | 10-2015-0104000 A | 9/2015 |

OTHER PUBLICATIONS

ISA/KR, "International Search Report and Written Opinion of the International Searching Authority," International Application No. PCT/KR2017/010579, dated Jan. 9, 2018, 10 pages.

\* cited by examiner

| TYPE OF EMERGENCY | EMERGENCY-RELATED KEYWORD | EMERGENCY NOTIFICATION CONTENT |
|---|---|---|
| EARTHQUAKE (210) | EARTHQUAKE, STRONG EARTHQUAKE, AFTERSHOCK, SEISMIC INTENSITY (211) | (212) |
| TSUNAMI (220) | TSUNAMI, TIDAL WAVE, SEA WAVE, INUNDATION (221) | (222) |
| FIRE (230) | FIRE, WILDFIRE, COMBUSTION, BURN DOWN (231) | (232) |
| HEAT WAVE (240) | HEAT WAVE, HOT, EXTREME HEAT, SWELTERING (241) | (242) |
| DOWNPOUR (250) | DOWNPOUR, HEAVY RAIN, LOTS OF RAIN, RAINFALL (251) | (252) |

FIG.2

-- ASN1 START

600~SystemInformationBlockType12-r9 ::= SEQUENCE {
  601~ MESSAGEiDENTIFIER-r9           BIT STARING  (SIZE (16)),
  602~ serialNumber-r9                BIT STARING  (SIZE (16)),
  603~ warningMessageSegmentType-r9  ENUMERATED {notLastSegment, lastSegment},
  604~ warningMessageSegmentNumber-r9 INTEGER (0..63),
  605~ warningMessageSegmet-r9      OCTET STARING,
  606~ dataCodingScheme-r9          OCTET STARING (SIZE (1))  OPTIONAL, -- Cond Segment1
  607~ lateNonCriticalExtension      OCTET STARING              OPTIONAL,
  [[
  611~ imageMessageType-r14         ENUMERATED {jpg, png},  OPTIONAL
  612~ imageMessageContainer-r14     OCTET STARING           OPTIONAL
  ]]
}

FIG.6B

METHOD FOR PROVIDING EMERGENCY SERVICE, ELECTRONIC DEVICE THEREFOR, AND COMPUTER READABLE RECORDING MEDIUM

CROSS-REFERENCE TO RELATED APPLICATIONS

This application is a National Phase Entry of PCT International Application No. PCT/KR2017/010579, which was filed on Sep. 26, 2017, and claims priority to Korean Patent Application No. 10-2016-0128589, which was filed on Oct. 5, 2016, the contents of which are incorporated herein by reference.

BACKGROUND

1. Field

The disclosure relates to a method of providing an emergency service and an electronic device and a computer-readable recording medium for the same.

2. Description of the Related Art

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post long-term evolution (LTE) system.

Telecommunications organizations including the International Telecommunication Union (ITU) and the 3rd Generation Partnership Project (3GPP) propose enhanced mobile broadband (eMBBB), ultra-reliable and low latency communications (URLLC) and massive machine type communication as three main use cases of 5G communication systems.

5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, a rising need exists for an enhanced disaster safety service for preparing for emergency (e.g., a typhoon, tsunami, or earthquake) or restoring disaster. Recently, emergency messages (or disaster messages) for emergency may be sent out to user terminals through a mobile communication network.

When receiving an emergency message, a user terminal may display emergency information contained in the emergency message on a display unit, allowing for the user's real-time check on the emergency.

SUMMARY

An electronic device (e.g., a terminal) receives an emergency message and displays emergency information contained in the received emergency message simply in the form of text on the display unit.

The language for the text may be set e language of the local area where the transmission of the emergency message occurs. For example, in a case where the transmission of emergency message occurs in Korea, the electronic device may receive the emergency message which has been set to Korean and display the emergency information which has been set to Korean on the display unit.

In such a scenario case, when the user is unable to read or understand the language of the local area where the transmission of emergency message occurs, the user may not grasp the emergency although the emergency information is displayed on the display unit, resulting in a failure in quick response (e.g., evacuation).

Further, a disaster alert system may randomly send out the same emergency messages to electronic devices. In this case, the emergency messages are sent out at the same time without consideration of each user's individual disaster. This fails to provide an evacuation method suited for each user.

Therefore, according to the disclosure, there are provided a method and device to provide an emergency service considering each user's individual situation and his language, allowing for quick evacuation and rescue from emergency.

Objects of the present disclosure are not limited to the foregoing, and other unmentioned objects would be apparent, one of ordinary skill in the art from the following description.

According to an embodiment of the disclosure, a method of providing an emergency service by an electronic device comprises the operations of receiving an emergency message, obtaining emergency-related information from the received emergency message, obtaining an emergency notification content corresponding to the obtained emergency-related information from among a plurality of emergency notification contents previously stored, and providing the obtained emergency notification content.

The emergency message may be received from a CMAS system or an ETWS system through a base station or a relay device according to a mobile communication protocol.

The emergency-related information may be an identifier indicating a type of emergency or an emergency-related keyword contained in the emergency message.

When the obtained emergency notification content is an image or a pictogram, the operation of providing the obtained emergency notification content may include the operation of displaying the image or the pictogram on a screen of the electronic device.

According to an embodiment of the disclosure, the method of providing the emergency service by the electronic device may further comprise the operations of analyzing the emergency message, determining a language used in the emergency message, and determining whether the determined language is the same as or different from a user language set in the electronic device.

The operation of obtaining the emergency notification content may obtain the emergency notification content corresponding to the extracted emergency-related information from among a plurality of emergency notification contents previously stored in the electronic device when it is determined that the language used in the emergency message differs from the user language set n the electronic device.

According to an embodiment of the disclosure, the method of providing the emergency service by the electronic device may further comprise the operations of translating emergency information contained in the emergency message into the user language and displaying the translated emergency information on a screen when it is determined that the language used in the emergency message differs from the user language set in the electronic device.

According to an embodiment of the disclosure, the method of providing the emergency service by the electronic device may displaying emergency information contained in the received emergency message on a screen when it is determined that the language used in the emergency message is the same as the user language set in the electronic device.

According to an embodiment of the disclosure, the method of providing the emergency service by the electronic device may further comprise the operation of obtaining state information about the electronic device. The operation of obtaining the emergency notification content may be obtaining the emergency notification content corresponding to the extracted emergency-related information from among the plurality of emergency notification contents previously stored in the electronic device based on the extracted emergency-related information and the obtained state information about the electronic device.

According to an embodiment of the disclosure, the method of providing the emergency service by the electronic device may further comprise the operations of obtaining location information or ambient information about the electronic device and transmitting the obtained location information or ambient information about the electronic device to an external device based on the extracted emergency-related information and the obtained location information about the electronic device.

According to another embodiment of the disclosure, an electronic device configured to provide an emergency service comprises a display unit, a storage unit configured to store a plurality of emergency notification contents, a communication unit configured to receive an emergency message, and a controller configured to obtain emergency-related information from the received emergency message, obtain an emergency notification content corresponding to the obtained emergency-related information from among the plurality of emergency notification contents stored in the storage unit, and display the emergency notification content on the display unit.

The emergency message may be received from a commercial mobile alert system (CMAS) system or an earthquake and tsunami warning system (ETWS) system through a base station or a relay device according to a mobile communication protocol.

The emergency-related information may be an identifier indicating a type of emergency or an emergency-related keyword contained in the emergency message.

When the obtained emergency notification content is an image or a pictogram, the controller may be configured to display the image or the pictogram on the display unit.

The controller may be configured to analyze the emergency message, determine a language used in the emergency message, and determine whether the determined language is the same as or different from a user language set n the electronic device.

The controller may be configured to obtain the emergency notification content corresponding to the extracted emergency-related information from among a plurality of emergency notification contents previously stored in the electronic device when it is determined that the language used in the emergency message differs from the user language set in the electronic device.

When it is determined that the language used in the emergency message differs from the user language set in the electronic device, the controller may be configured to translate emergency information contained in the emergency message into the user language and control the display unit to display the translated emergency information on a screen.

When it is determined that the language used in the emergency message is the same as the user language set in the electronic device, the controller may be configured to control the display unit to display emergency information contained in the received emergency message on a screen.

The controller may be configured to obtain state information about the electronic device and obtain the emergency notification content corresponding to the extracted emergency-related information from among the plurality of emergency notification contents previously stored in the electronic device based on the extracted emergency-related information and the obtained state information about the electronic device.

The controller may be configured to obtain location information or ambient information about the electronic device and transmit the obtained location information or ambient information about the electronic device to an external device based on the extracted emergency-related information and the obtained location information about the electronic device.

According to still another embodiment of the disclosure, a computer-readable non-transitory recording medium stores a program to enable an electronic device to perform the operation of receiving an emergency message, the operations of analyzing the received emergency message and extracting emergency-related information, the operation of obtaining an emergency notification content corresponding to the extracted emergency-related information from among a plurality of emergency notification contents previously stored in the electronic device, and the operation of providing the obtained emergency notification content.

According to an embodiment of the disclosure, when an emergency occurs, an electronic device may provide easily-perceivable emergency notification content corresponding to emergency-related information extracted from an emergency message, allowing the user of the electronic device to quickly respond to the emergency.

In particular, as emergency information translated in the user's language is provided or an image, which is visual information, is provided as the emergency notification content, the user of the electronic device may quickly recognize the emergency.

Further, the user's location where the emergency has occurred may be transmitted to an emergency management server based on the location of the electronic device and the emergency message, leading to a response to the emergency, e.g., quickly rescuing the user.

Further, a way to respond to emergency is provided based on an emergency message, the location of the electronic device, and user information stored in the electronic device. This provides for a flexible way to deal with the emergency.

The other effects achievable or predictable according to embodiments of the present disclosure are explicitly or implicitly disclosed by the detailed description of embodiments of the present disclosure. For example, various effects predicted according to embodiments of the present disclosure are disclosed in the following detailed description.

BRIEF DESCRIPTION OF THE DRAWINGS

FIG. 2 is a view illustrating a matching table including emergency notification contents according to an embodiment of the disclosure;

FIGS. 4 to 6A are flowcharts illustrating a method of providing an emergency service according to an embodiment of the disclosure;

FIG. 6B is a view illustrating a system information block type related to an emergency message according to an embodiment of the disclosure;

DETAILED DESCRIPTION

Figure 1:
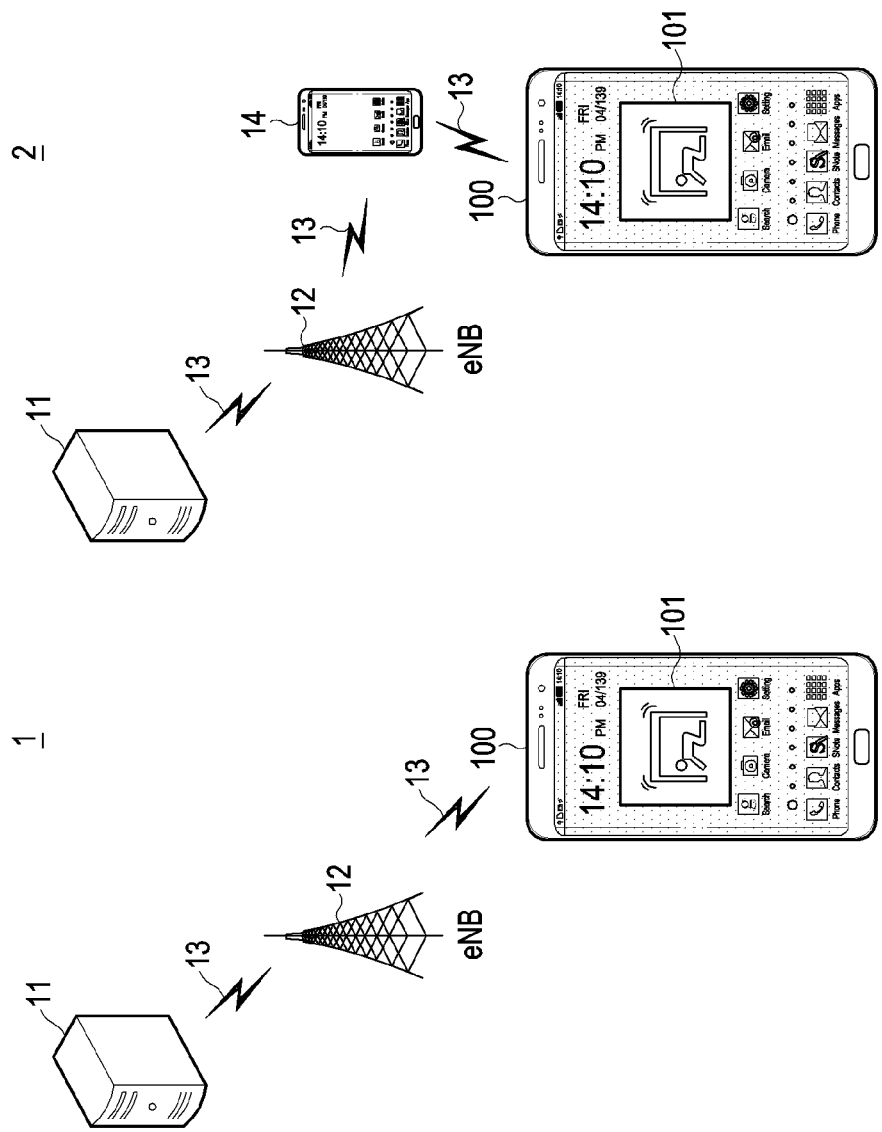
FIG. 1A is a view illustrating an emergency message transmission system 1 to provide an emergency service according to an embodiment of the disclosure.
FIG. 1B is a view illustrating an emergency message transmission system 2 to provide an emergency service according to an embodiment of the disclosure.

Hereinafter, embodiments of the present disclosure are described in detail with reference to the accompanying drawings. The same reference numerals are used to refer to same elements throughout the drawings. When determined to make the subject matter of the present disclosure unclear in describing embodiments of the disclosure, the detailed of the known functions or configurations may be skipped. The terms described below are defined considering the functions in embodiments of the present disclosure and may be replaced with other terms according to the intention or practice of the user or operator. Therefore, the terms should be defined based on the overall disclosure.

As used herein, the singular forms "a," "an," and "the" are intended to include the plural forms as well, unless the context clearly indicates otherwise. Accordingly, as an example, a "component surface" includes one or more component surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

The terms as used herein are provided merely to describe some embodiments thereof, but not to limit the disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the phrases "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of."

It will be understood that when a first element (e.g., a first element) is referred to as being (operatively or communicatively) "coupled with/to," or "connected with/to" a second element (e.g., a second element), it can be coupled or connected with/to the other element directly or via another element (e.g., a third element).

Unless otherwise defined in connection with embodiments of the present disclosure, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For example, the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™ Apple TV™, or Google TV™), a gaming console (Xbox™, PlayStation™), an electronic dictionary, an electronic key, a camcorder, or an electronic picture frame. According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present disclosure, the electronic device may be flexible or may be a combination of the above-enumerated electronic devices. According to an embodiment of the present disclosure, the electronic device is not limited to the above-listed embodiments. As used herein, the term "user" may denote a human or another device (e.g., an artificial intelligent electronic device) using the electronic device.

The disclosure relates to a method of providing an emergency service based on a received emergency message and an electronic device and a computer-readable recording medium for the same.

Meanwhile, a rising need exists for an enhanced disaster safety service for preparing for emergency (e.g., a typhoon, tsunami, or earthquake) or restoring disaster. Recently, emergency messages (or disaster messages) for emergency may be sent out to user terminals through a mobile communication network.

For example, a commercial mobile alert system (CMAS) system or an earthquake and tsunami warning (ETWS) system, as a disaster alert system, may provide emergency information as text information (i.e., emergency messages) to base stations. The CMAS system is a type of disaster alert system adopted in most countries including the U.S., Korea, and Europe, and the ETWS system is a type of disaster alert system adopted mainly in Japan.

Upon receiving emergency message from an ETWS system, a base station may cell-broadcast emergency messages to terminals using system information block type 10 or 11. When receiving text information from a CMAS system, a base station may cell-broadcast emergency messages to terminals using system information block type 12.

When receiving an emergency message, a terminal may display emergency information contained in the emergency message on a display unit, allowing for the user's real-time check on the emergency.

As used herein, emergency messages may be any type of emergency messages to indicate emergency. For example, an emergency message may be a message provided from any system. As an example, when an emergency (e.g., typhoon, tsunami, earthquake, or other disasters) occurs, an emergency message may be a message provided from a disaster alert system, e.g., the CMAS system, ETWS system, or cell broadcast message system (CBS).

The emergency message may be of a type specified in a mobile communication standard. For example, the emergency message may be a short message service (SMS) message. The emergency message may contain at least one piece of information of, e.g., information related to the type of emergency, information related to the time of occurrence of emergency, information related to the location of emergency, and information related to the degree of emergency.

Hereinafter, preferred embodiments of the disclosure are described with reference to the drawings to allow one of ordinary skill in the art to which the disclosure pertains to easily practice the disclosure.

FIGS. 1A and 1B are views illustrating an emergency message transmission system 1 or 2 to provide an emergency service according to an embodiment of the disclosure.

In an embodiment, referring to FIG. 1A, an emergency message transmission system 1 may include an electronic device 100, an emergency information provider server 11, a base station 12, and a communication network 13. In this case, an emergency message generated from the emergency information provider server 11 may be transmitted via the base station 12 to the electronic device 100 using the communication network 13.

In another embodiment, referring to FIG. 1B, an emergency message transmission system 2 may include an electronic device 100, an emergency information provider server 11, a base station 12, a communication network 13, and a relay device 14. In this case, when the base station 12 and the electronic device 100 may not communicate with each other (e.g., when the base station covering the electronic device 100 provides no communication service due to disaster), the relay device 14 may establish a communication connection between the base station 12 and the electronic device 100 according to a D2D communication scheme. In this case, an emergency message generated from the emergency information provider server 11 may be transmitted via the base station 12 to the relay device 14 using the communication network 13 according to a cellular communication scheme. When receiving the emergency message, the relay device 14 may directly transmit the received emergency message to the electronic device 100 using the communication network 13 according to a DD communication scheme.

In FIGS. 1A and 1B, the electronic device 100 may be any one of various types of devices described above. For example, the electronic device 100 may be denoted user equipment (or communication terminal), node, mobile station (MS), mobile equipment (ME), device, or terminal.

The emergency information provider server 11 generates an emergency message and transmits the emergency message to each user's electronic device 100 via the base station 12. At this time, the emergency message transmitted may contain at least one piece of information of, e.g., information related to the type of emergency (e.g., earthquake, tsunami, fire, or heat wave), information related to the time of occurrence of emergency, information related to the location of emergency, and information related to the degree of emergency (e.g., the strength of earthquake or tsunami, the range of fire, or the temperature of heat wave), as set forth above.

Such an emergency message may be generated as a message in a predetermined type specified in a mobile communication standard and be transmitted by a mobile communication standard protocol.

The emergency message transmitted from the emergency information provider server 11 may be transmitted via the base station 12 to the electronic device 100 using the communication network 13.

The base station 12 is a piece of wireless communication equipment to connect a server with a terminal or a terminal with another terminal via the communication network 13 to support a wireless communication service. The range in which the base station 12 may support a wireless communication service is denoted a cell. The base stations 12 may be located adjacent each other to continue to provide the communication service although a terminal moves from one cell to another. The base station may be denoted a BS, nodeb(NB), enodeb(eNB), or access point (AP).

The communication network 13 may be configured without being limited to a particular aspect, e.g., wireless or wired, and be configured as one of various communication networks, such as a personal area network (PAN), a local area network (LAN), a metropolitan area network (MAN), or a wide area network (WAN). Or, the communication network 13 may be a known world wide web (WWW) and may take advantage of wireless transmission technology used for short-range communications, such as infrared (IrDA) or Bluetooth. The communication network 13 may include a cable broadcast communication network, terrestrial broadcast communication network, or satellite broadcast communication network to transmit broadcast signals.

Using the communication network 13, the electronic device 100 may receive an emergency message from the emergency information provider server 11 via the base station 12 or the relay device 14. The electronic device 100 may analyze the received emergency message and extract emergency-related information, according to an embodiment of the disclosure.

As an example of the emergency-related information, the electronic device 100 may determine that messages received in system information block type 10, 11, or 12 are emergency messages. The electronic device 100 may syntax-analyze the content of the emergency message and extract at least one emergency-related keyword contained in the emergency message.

Specifically, when the emergency message contains such content as "An earthquake occurred in Gyeongju," the electronic device 100 may analyze the emergency message and extract the emergency-related keyword "earthquake." Further, when the emergency message contains such content as "A tsunami occurred in the Busan coast," the electronic device 100 may analyze the emergency message and extract the emergency-related keyword "tsunami."

The foregoing is an example of the disclosure, and an emergency-related keyword may also be extracted by syntax analysis from other types of emergency messages.

Next, the electronic device 100 may obtain an emergency notification content corresponding to the emergency-related information extracted from the emergency message from among a plurality of emergency notification contents previously stored in the electronic device 100.

The emergency notification content may be one, or a combination of two or more, of, e.g., a video, an image, or a sound. Preferably, the emergency notification content may be an image or pictogram. The pictogram may be a symbolic image to allow normal people to easily understand, e.g., a thing, facility, behavior, or concept.

In an embodiment, the electronic device 100 may obtain the emergency notification content using a matching table between emergency notification contents and emergency-related keywords stored in a storage unit.

FIG. 2 is a view illustrating a matching table 200 including emergency notification contents (e.g., pictograms) each of which corresponds to a respective one of pieces of emergency-related information (e.g., emergency-related keywords).

The matching table 200 may be in the state of having previously been stored in a storage unit of the electronic device 100. Or, the matching table 200 may be in the state of having previously been stored in a storage unit of an external device (e.g., a server or other terminal) (not shown) connected with the electronic device 100 via a network.

In the matching table 200, one emergency-related keyword may correspond to one emergency notification content, or a plurality of emergency-related keywords may correspond to one emergency notification content.

For example, emergency-related keywords 211, e.g., "earthquake," "strong earthquake," "aftershock," and "seismic intensity," indicating earthquake in the first row 210 of the matching table 200 may correspond to an earthquake pictogram 212 that symbolizes the occurrence of an earthquake or getting under a desk. Emergency-related keywords 221, e.g., "tsunami," "tidal wave," "sea wave," and "inundation," indicating tidal wave in the second row 220 may correspond to an tsunami pictogram 222 that symbolizes the occurrence of a tsunami or evacuating to a higher ground. Emergency-related keywords 231, e.g., "fire," "wildfire," "combustion," and "burn down," indicating fire in the third row 230 may correspond to a fire pictogram 232 that symbolizes the occurrence of a fire or evacuation through an exit. Emergency-related keywords 241, e.g., "heat wave," "heat," "extreme heat," and "sweltering," indicating heat wave in the fourth row 240 may correspond to a heat wave pictogram 242 that symbolizes the occurrence of a heat wave or staying inside. Emergency-related keywords 251, e.g., "downpour," "heavy rain," "lots of rain," and "rainfall," indicating downpour in the fifth row 250 may correspond to a downpour pictogram 252 that symbolizes the occurrence of a downpour.

Next, the electronic device 100 may provide the user with the emergency notification content obtained based on the matching table 200.

For example, when the emergency notification content that the electronic device 100 has extracted is one, "earthquake," of the emergency-related keywords 211 indicating earthquake, the electronic device 100 may obtain the earthquake pictogram 212 as an emergency notification content corresponding to the keyword "earthquake."

The electronic device 100 may display the obtained earthquake pictogram 212 in a pop-up screen 101 of FIG. 1.

Figure 3:
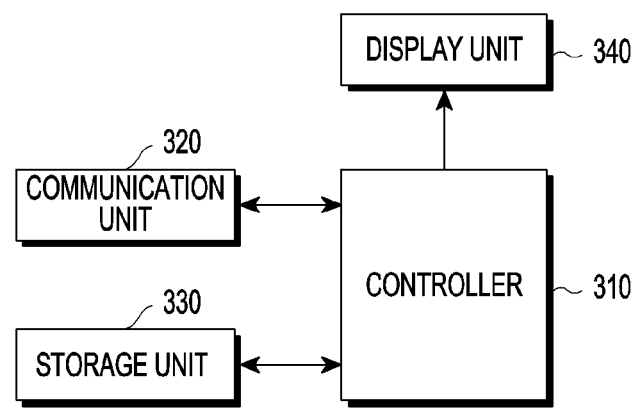
FIG. 3 is a block diagram illustrating an internal configuration of an electronic device to provide an emergency service according to an embodiment of the disclosure.

FIG. 3 is a block diagram illustrating an internal configuration of an electronic device to provide an emergency service according to an embodiment of the disclosure.

Further, the term " . . . unit" and the suffix " . . . er" as used herein denote a unit processing at least one function or operation and be implemented in hardware, software, or a combination thereof.

Referring to FIG. 3, an electronic device 100 includes a controller 310, communication unit 320, a storage unit 330, and a display unit 340.

The communication unit 320 may receive an emergency message from a base station or a relay device. Besides, the communication unit 320 may receive various signals, messages, or data from other entities under the control of the controller 310. The communication unit 320 may include all or some of the communication modules 1220, 1231, 1232, and 1241 of the electronic device 100 of FIG. 12.

The communication unit 320 performs functions to receive signals via a wireless channel. The communication unit 320 may include a transceiver to transmit signals and receive signals. For example, the communication unit 320 may perform, e.g., reception of RF signals, frequency transform, demodulation, decoding, cyclic prefix (CP) removal, fast Fourier transform (FFT), channel estimation, and equalizing. Additionally, the communication unit 320 may transmit signals processed by the controller 310 to other entities.

The communication unit 310 may include at least one of, e.g., a cellular module, a Wi-Fi module, a Bluetooth module, a GNSS module, an NFC module, and an RF module. The cellular module may provide voice call, video call, text, or Internet services through, e.g., a network. The cellular module may include a communication processor (CP). According to an embodiment, at least some (e.g., two or more) of the cellular module, the Wi-Fi module, the Bluetooth module, the GNSS module, or the NFC module may be included in a single IC or an IC package.

The storage unit 330 (or a memory) may store emergency-related information which has been extracted by analysis of an emergency message under the control of the controller 310 and may store a plurality of emergency notification contents. For example, the storage unit 330 may store a matching table, such as the one shown in FIG. 2, containing the emergency notification content corresponding to the emergency-related information. Besides, the storage unit 330 may store various programs and data to provide an emergency service according to the disclosure. Further, the storage unit 330 may store various signals, messages, and data which the communication unit 320 has received from other entities. The storage unit 330 may include the whole or part of the storage unit 1275 of the electronic device 100 shown in FIG. 12.

When the emergency notification content corresponding to the emergency-related information extracted from the emergency message is visual information, the display unit 340 may display the same on the screen. Besides, the display unit 340 may display various pieces of information and data processed by the controller 310. The display unit 340 may be in the form of a touchscreen combined with, e.g., a touch panel, and may include the whole or part of the touchscreen 1290 of the electronic device 100 shown in FIG. 12.

The controller 310 (or a processor) controls the overall operation of the electronic device 100. In particular, the controller 310 controls the overall operation related to providing an emergency service according to an embodiment of the disclosure. The controller 310 may receive signals, messages, and data via the communication unit 320. Further, the controller 310 may record data (e.g., emergency messages or emergency-related information) in the storage unit 330 and read data (e.g., emergency notification contents) out of the storage unit 330. To that end, the controller 310 may include at least one processor, microprocessor, or microcontroller, or be part of a processor. The controller 310 may include the whole or part of the controller 1210 of the electronic device 100 shown in FIG. 12.

According to an embodiment, the communication unit 320 may receive an emergency message. The emergency message may be received from, e.g., a CMAS system or ETWS system, via a base station or relay device according to a mobile communication protocol.

Next, the controller 310 may analyze the received emergency message and extract emergency-related information. The emergency-related information may be, e.g., an emergency-type identifier or emergency-related keyword contained in the emergency message. The controller 310 may obtain the emergency notification content corresponding to the extracted emergency-related information from among a plurality of emergency notification contents stored in the storage unit 330.

The display unit 340 may display the obtained emergency notification content on the screen under the control of the controller 310. As an example, when the emergency notification content is an image or pictogram, the display unit 340 may display the image or pictogram on the screen.

According to various embodiments, the controller 310 may analyze the received emergency message and determine the language used in the emergency message. The controller 310 may determine whether the determined language is the same as or different from the user language set in the electronic device 100.

When the language used in the emergency message is determined to differ from the user language set in the electronic device 100, the controller 310 may obtain the emergency notification content corresponding to the emergency-related information extracted as per a result of analysis of the emergency message.

As another example, when the language used in the emergency message is determined to differ from the user language set in the electronic device 100, the controller 310 may translate the emergency information contained in the emergency message into the user language set in the electronic device. The display unit 340 may display the translated emergency information on the screen under the control of the controller 310.

As another example, when the language used in the emergency message is determined to be the same as the user language set in the electronic device 100, the display unit 340 may display the emergency information of the received emergency message on the screen under the control of the controller 310.

According to various embodiments, the controller 310 may obtain state information about the electronic device 100. In this case, the controller 310 may obtain the emergency notification content corresponding to the emergency-related information based on the obtained state information about the electronic device 100 and the emergency-related information extracted according to a result of analysis of the emergency message. In this case, obtaining the emergency notification content based on the emergency-related information may include obtaining the emergency notification content based on the type of emergency.

According to various embodiments, the controller 310 may obtain location information or ambient information about the electronic device 100. The location information may be information indicating the current location of the electronic device 100 and the ambient information may be information about the surroundings of the electronic device 100, and such information may be, but is not limited to, e.g., information captured by a camera of the electronic device 100 or information about a smell, illuminance, altitude, temperature, or humidity detected by a sensor of the electronic device 100.

In this case, the controller 310 may control the communication unit 320 to transmit the obtained ambient information and location information about the electronic device 100 to an external device based on the obtained location of the electronic device 100 and the emergency-related information extracted according to a result of analysis of the emergency message.

Although FIG. 3 shows that the electronic device 100 includes the controller 310, the communication unit 320, the storage unit 330, and the display unit 340, the electronic device 100 may add other components than those described above, an example of which is described below in connection with FIG. 12.

Figure 4:
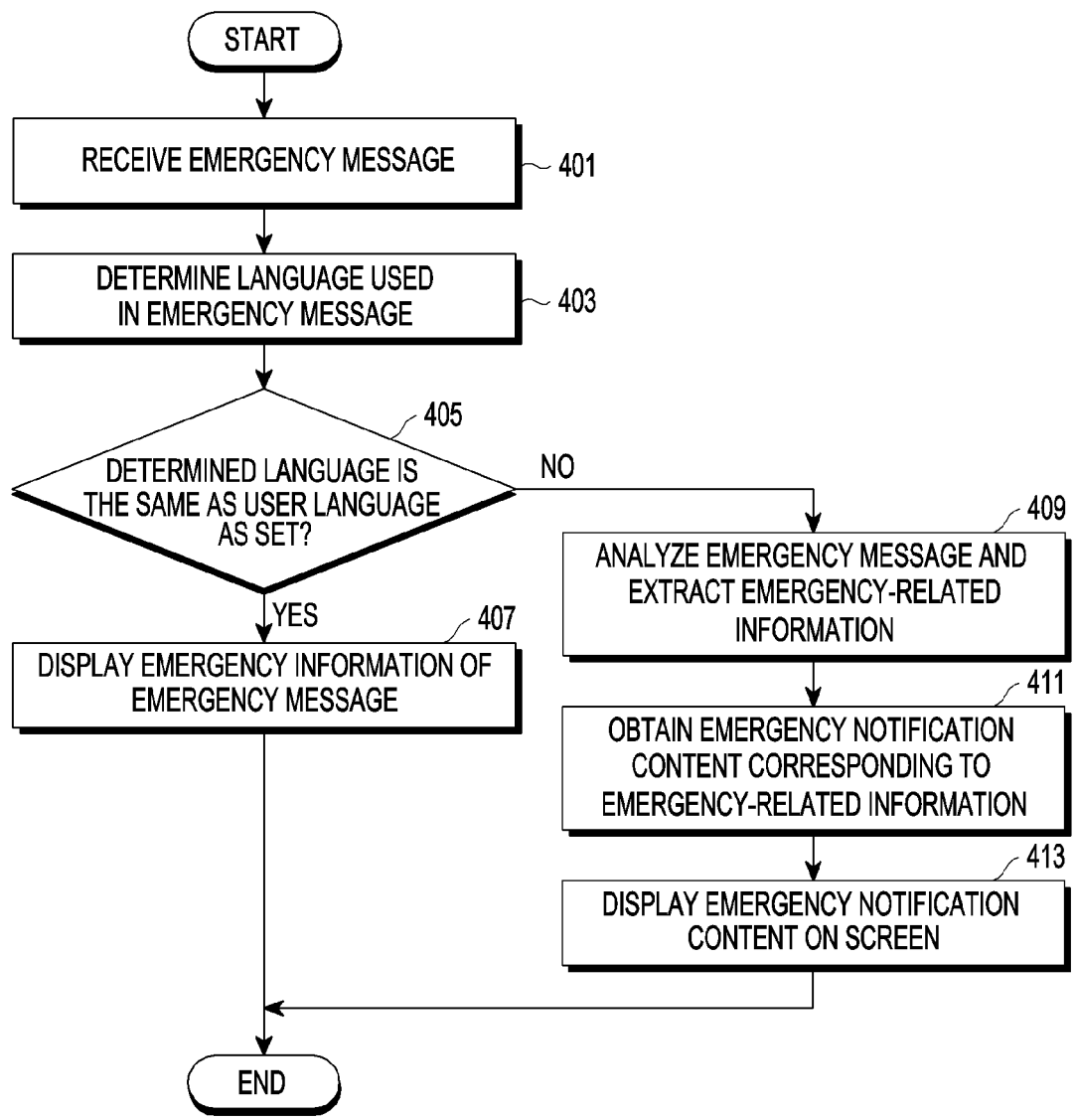

FIG. 4 is a flowchart illustrating a method of providing an emergency service by an electronic device 100 according to an embodiment of the disclosure.

Referring to FIG. 4, the communication unit 320 may receive an emergency message (401). For example, the emergency message may be an ETWS message provided from the above-described ETWS system, a CMAS message provided from a CMAS system, or a CBS message provided from a CBS system.

The controller 310 may analyze the received emergency message and determine the language used in the emergency message (403).

Specifically, the controller 310 may analyze a language code (e.g., a dataCodingScheme element contained in system information block type 12) contained in the header of the ETWS message, CMAS message, or CBS message and determine the language used in the emergency message.

Next, the controller 310 may determine whether the determined language is the same as the user language set in the electronic device 100 (405).

For example, the controller 310 may determine whether the determined language is the same as operation system (OS) setting language which is the local setting language in the electronic device.

When the determined language is determined to be the same as the user language, the display unit 340 may display the emergency information contained in the received emergency message, as is, on the screen (407).

By contrast, when the determined language is determined to be different from the user language, the controller 310 may analyze the emergency message and extract emergency-related information (409). The controller 310 may retrieve and obtain the emergency notification content corresponding to the extracted emergency-related information from among a plurality of emergency notification contents stored in the storage unit 330 (411). The emergency notification content may be visual information, e.g., an image or pictogram.

Next, the display unit 340 may display the obtained emergency notification content on the screen (413).

Figure 5:
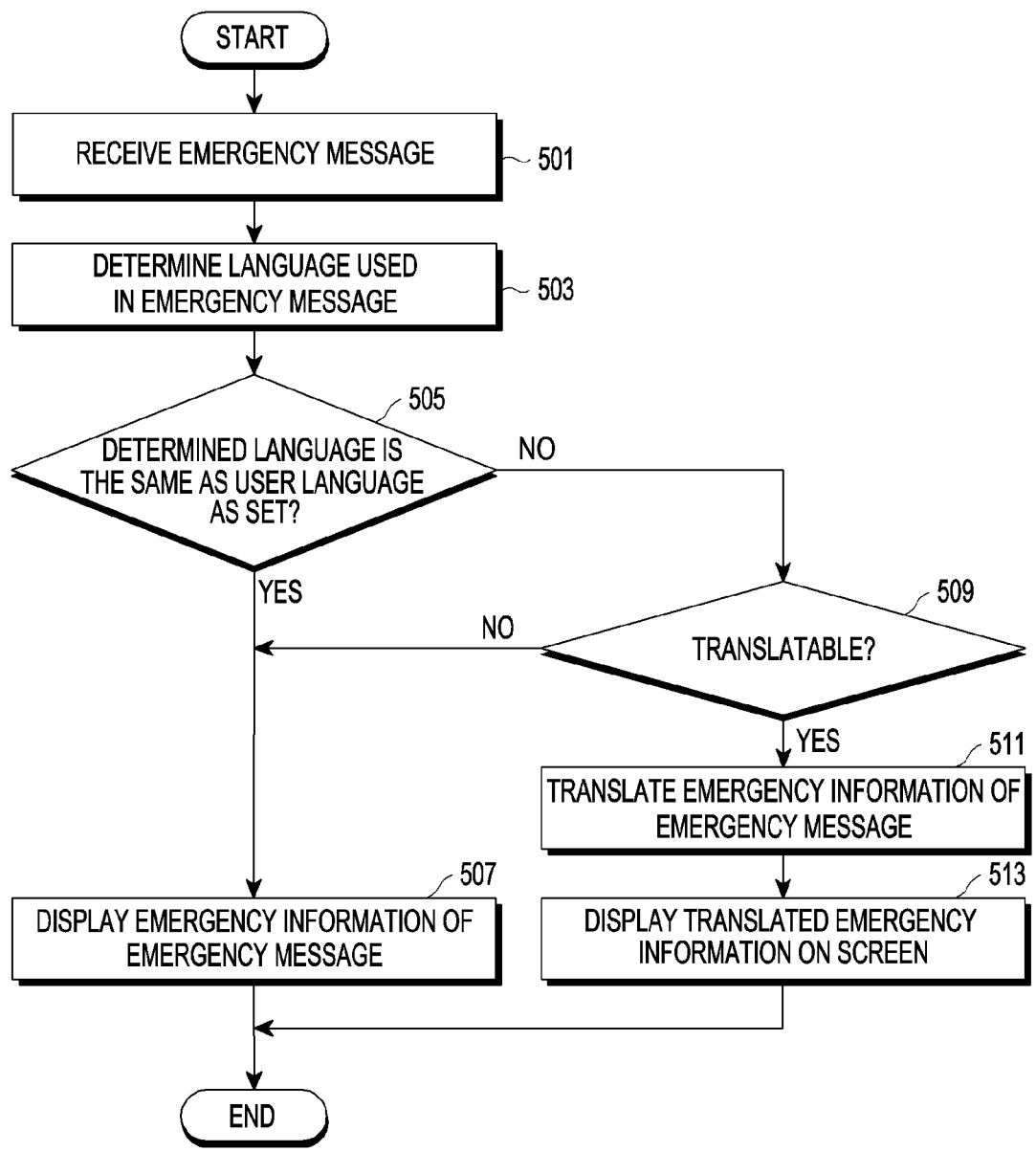

FIG. 5 is a flowchart illustrating a method of providing an emergency service by an electronic device 100 according to another embodiment of the disclosure.

Operations 501 to 505 of FIG. 5 correspond to operations 401 to 405 of FIG. 4 and, thus, no repetitive description is given below.

In operation 505, when the determined language is determined by the controller 310 to be the same as the user language, the display unit 340 may display the emergency information contained in the received emergency message, as is, on the screen (507).

In contrast, when the determined language is determined to differ from the user language, the controller 310 may determine whether the emergency information contained in the emergency message is translatable into the user language (e.g., the OS setting language) set in the electronic device 100 (509).

Unless the emergency information is determined to be translatable, the display unit 340 may display the emergency information contained in the received emergency message, as is, on the screen (507).

By contrast, when translatable, the controller 310 may translate the emergency information contained in the emergency message into the user language set in the electronic device 100 (511).

In this case, the controller 310 may translate the emergency information into the user language using a translation application installed on the electronic device 100. Or, the controller 310 may transmit the emergency information to a translation server that is located outside the electronic device 100 and receive a result of translation from the translation server.

Next, the display unit 340 may display the emergency information in the translated language on the screen (513).

Figure 6A:
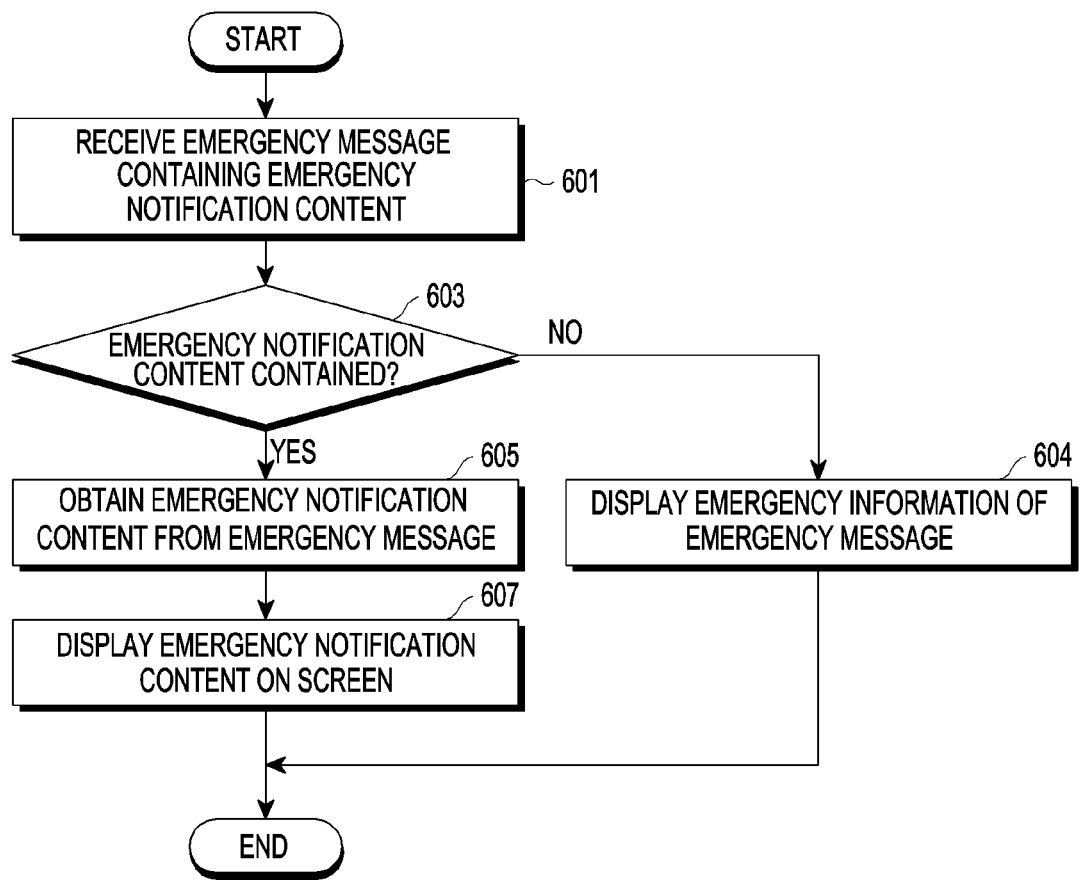

FIG. 6A is a flowchart illustrating a method of providing an emergency service by an electronic device according to another embodiment of the disclosure.

Referring to FIG. 6A, the electronic device 100 may receive an emergency message containing an emergency notification content (601). The emergency message may be a message that complies with a type of mobile communication standard.

For example, FIG. 6B is a view illustrating a structure of a system information block that complies with a type of mobile communication standard and contains an emergency notification content. Here, the type of mobile communication standard may be an application example of an existing communication standard (e.g., the LTE communication standard) to apply an embodiment of the disclosure.

FIG. 6B illustrates system information block type 12 600 related to an emergency message provided from a CMAS system, received from a base station or relay device.

The description of 'MESSAGEiDENTIFIER' 601, 'serialNumber' 602, 'wariningMessageSegmentType' 603, 'wariningMessageSegmentNumber' 604, 'wariningMessageSegment' 605, 'dataCodingScheme' 606, and 'lateNonCriticalExtension' 607 among the information elements of the system block has already been known through the 'LTE standard ETSI TS 136 331' standard and is thus omitted here.

In this case, the system block, as an application example of the existing standard, may further include an 'imageMessageType' element 611 and an 'imageMessageContainer' element 612 related to emergency notification content.

The 'imageMessageType' element 611 represents the type of emergency notification content. For example, as types of emergency notification content, information regarding extensions of an image file, e.g., jpg, jpeg, bmp, emf, wmf, or png, may be set.

The 'imageMessageContainer' element 612 represents the volume of the container of emergency notification content. In this case, the container may include, e.g., a mono image which is relatively smaller volume than a color image, as the emergency notification content.

Although the disclosure describes that the 'imageMessageType' element 611 and the 'imageMessageContainer' element 612 related to the emergency notification content are contained in system information block type 12, the elements are also applicable to system information block type 10 or 112 which is provided from the ETWS system, according to an embodiment.

Referring back to FIG. 6A, when the emergency message is received, the controller 310 may analyze the emergency message and determine whether it contains an emergency notification content (603).

When it is determined that no emergency notification content is contained, the controller 310 may display the emergency information in the form of text contained in the emergency notification (604).

When it is determined on the contrary that an emergency notification content is contained, the controller 310 may obtain the emergency notification content from the received emergency message (605).

Next, the display unit 340 may display the obtained emergency notification content on the screen (607).

As such, when the base station or relay device transmits the above-described emergency notification content-containing system information block to the electronic device 100 as per the LTE standard or its application, the electronic device 100 may obtain the emergency notification content from the received system information block and display the emergency notification content on the screen.

According to various embodiments, the system information block may include an 'imageIdentifier' (not shown) that indicates the type of emergency. For example, in the case where the electronic device 100 previously stores a plurality of emergency notification contents, the controller 310 may parse the system information block and obtain the identifier that indicates the type of emergency.

The controller 310 may obtain the emergency notification content that matches the identifier indicating the type of the obtained emergency among the pre-stored emergency notification contents.

Accordingly, the display unit 340 may display the obtained emergency notification content on the screen.

Figure 7:
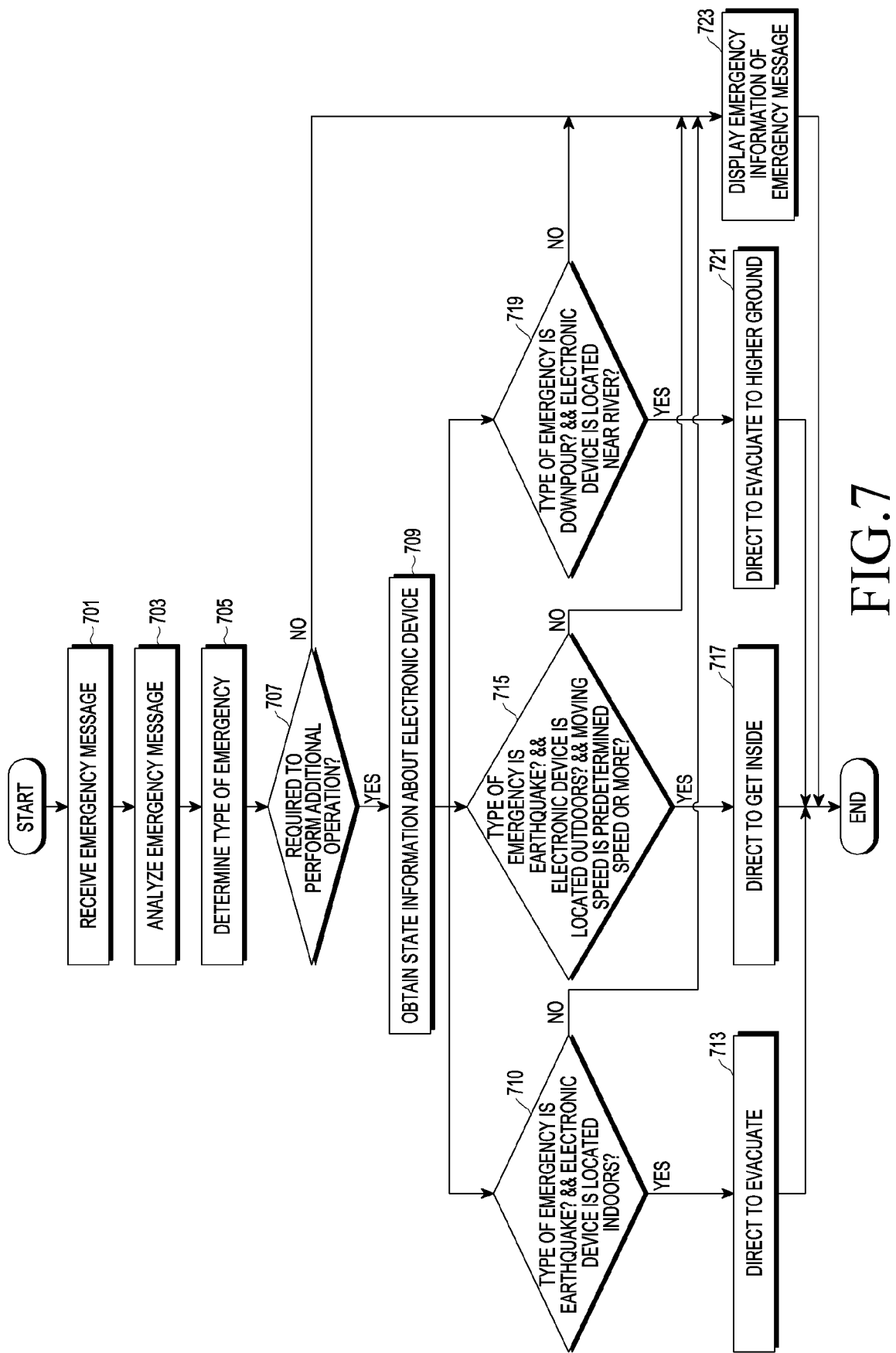
FIGS. 7 and 8 are flowcharts illustrating a method of providing an emergency service according to another embodiment of the disclosure.

FIG. 7 is a flowchart illustrating a method of providing an emergency service by an electronic device 100 according to another embodiment of the disclosure.

Referring to FIG. 7, the communication unit 320 may receive an emergency message (701).

Next, the controller 310 may analyze the emergency message (703).

As a result of the message analysis, the controller 310 may determine the type of emergency (705).

For example, the controller 310 may analyze the emergency message, extract the emergency-related information, and determine the type of emergency depending on the extracted emergency-related information.

Specifically, the controller 310 may syntax-analyze the content of the emergency message and extract at least one emergency-related keyword contained in the emergency message. The controller 310 may determine the type of emergency based on the at least one emergency-related keyword extracted (705).

In this case, the controller 310 may determine the type of emergency matching the emergency-related keyword using the matching table of FIG. 2.

For example, when the extracted emergency-related keyword is "earthquake," "strong earthquake," "aftershock," or "seismic intensity," the controller 310 may determine that the type of emergency is an 'earthquake.' When the extracted emergency-related keyword is "tsunami," "tidal wave," "sea wave," or "inundation," the controller 310 may determine that the type of emergency is a 'tsunami.' When the extracted emergency-related keyword is "fire," "wildfire," "combustion," or "burn down," the controller 310 may determine that the type of emergency is a 'fire.' When the extracted emergency-related keyword is "heat wave," "sweltering," "heat," or "extreme heat," the controller 310 may determine that the type of emergency is a 'heat wave.' When the extracted emergency-related keyword is "downpour," "heavy rain," "lots of rain," or "rainfall," the controller 310 may determine that the type of emergency is a 'downpour.'

As another example, the controller 310 may analyze the emergency message, obtain an identifier indicating the type of emergency from an information element (e.g., the 'imageIdentifier' contained in the system information block) indicating the type of emergency, and determine the type of emergency based on the obtained identifier.

Next, the controller 310 may determine whether an additional operation by the controller 310 is necessary depending on the determined type of emergency (707).

For example, the controller 310 may determine whether the controller 310 is required to perform an additional operation considering the type of emergency and relevancy with the user.

For example, when the type of emergency is highly related to natural disaster, e.g., 'earthquake' or 'downpour,' the electronic device 100 may determine that the emergency is such a type that requires the electronic device 100 to perform an additional operation. In contrast, when the type of emergency is less related to natural disaster, e.g., 'extra event,' 'successful candidate,' or 'promulgation,' the electronic device 100 may determine that no additional operation is required to be performed.

In this case, types of emergency requiring an additional operation may previously be designated by the user before the emergency occurs. In other words, the user may previously and selectively designate natural disasters requiring an additional operation. Or, types of emergency requiring an additional operation may be designated as default by the manufacturer of the electronic device 100, the provider of an application installed on the electronic device 100, or the provider of the operating system.

When it is determined that no additional operation is required, the display unit 340 may display the emergency information contained in the emergency message, as is, on the screen.

Upon determining that an additional operation is required, the controller 310 may obtain state information about the electronic device 100 (709).

The state information about the electronic device 100 may include at least one of the location of the electronic device 100 obtained using, e.g., a location recognizer module (e.g., a GPS module) or the moving speed of the electronic device 100 calculated based thereupon. Or, the state information about the electronic device 100 may include at least one of the acceleration, rotating angle, slope, moving speed, whether impacted or not, or whether grabbed or not, as obtained using a detecting sensor (e.g., an acceleration sensor, geo-magnetic sensor, or impact sensor).

Next, the controller 310 may provide an emergency notification content containing a response guide suited for the emergency to the user based on the state information about the electronic device 100 and the type of emergency. In this case, the emergency notification content which serves as a response guide may be at least one of a video, image, text, and audio.

For example, the controller 310 may determine whether the type of emergency is an 'earthquake' and whether the location of the electronic device 100 is indoor (710). When it is determined that the above-described conditions are met, the electronic device 100 may provide an emergency notification content to direct the user to evacuate (713). Unless it is determined that the above-described conditions are met, the display unit 340 may display the emergency information contained in the received emergency message, as is, on the screen (723).

Or, the controller 310 may determine whether the type of emergency is a 'heat wave,' whether the location of the electronic device 100 is outdoor, and whether the moving speed of the electronic device 100 is a predetermined speed or more. When it is determined that the above-described conditions are met, the electronic device 100 may provide an emergency notification content to direct the user to take a rest or get inside (717). Unless it is determined that the above-described conditions are met, the display unit 340 may display the emergency information contained in the received emergency message, as is, on the screen (723).

Or, the controller 310 may determine whether the type of emergency is a 'downpour' and whether the location of the electronic device 100 is near a river. When it is determined that the above-described conditions are met, the electronic device 100 may provide an emergency notification content to direct the user to evacuate to a higher ground (721). Unless it is determined that the above-described conditions are met, the display unit 340 may display the emergency information contained in the received emergency message, as is, on the screen (723).

Although such an embodiment has been described above in connection with FIG. 7 that a determination is made based on whether three conditions are met depending on the location or moving speed of the electronic device and the type of emergency, the disclosure is not limited thereto and may provide the user with an emergency notification content containing a response guide suited for the emergency considering more various scenario cases.

Figure 8:
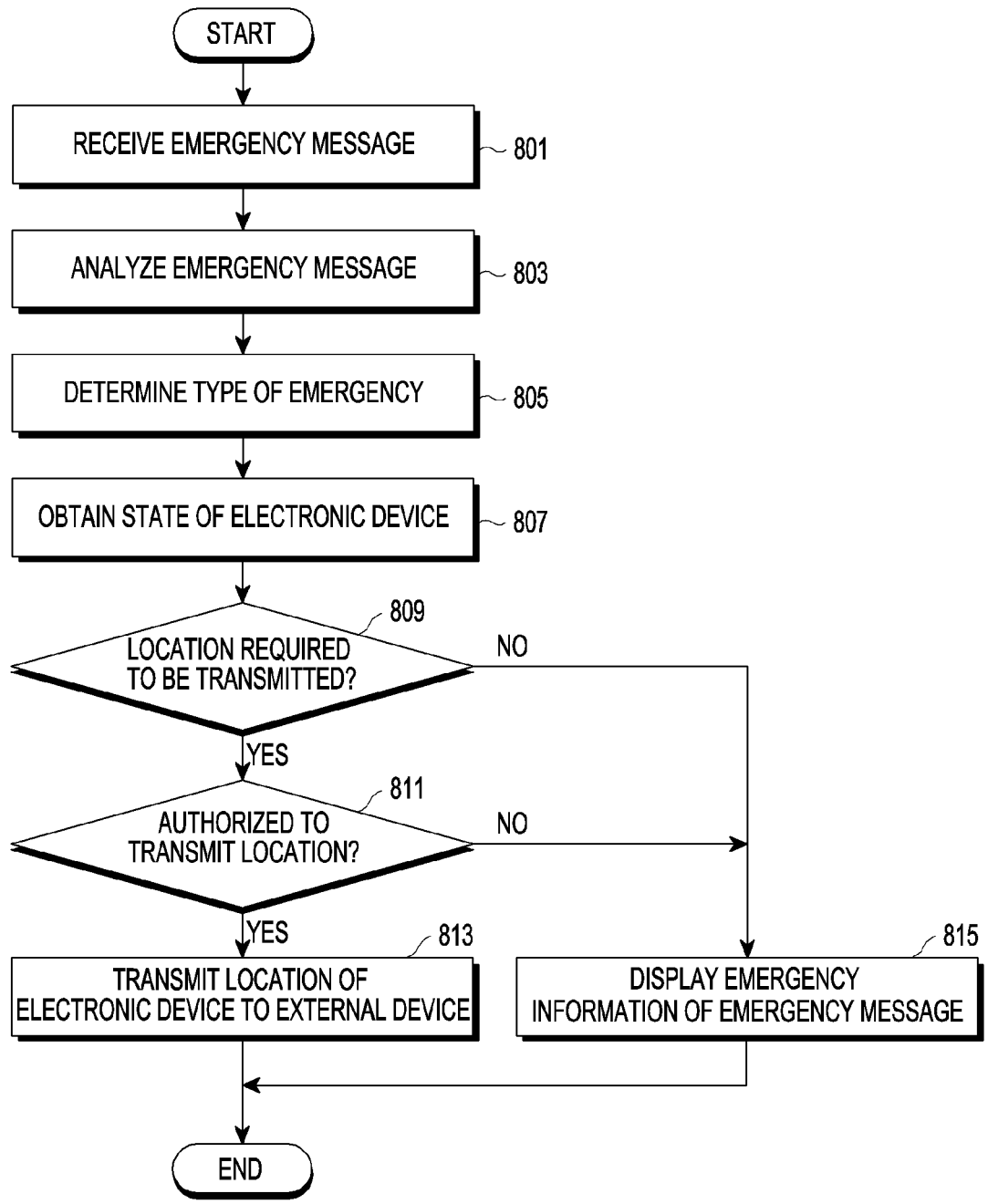

FIG. 8 is a flowchart illustrating a method of providing an emergency service by an electronic device 100 according to another embodiment of the disclosure.

Referring to FIG. 8, the communication unit 320 may receive an emergency message (801).

Next, the controller 310 may analyze the emergency message (803).

As a result of the emergency message analysis, the controller 310 may determine the type of emergency (805). The process in which the controller 310 determines the type of emergency corresponds to operation 705 of FIG. 7 and no repetitive description is thus given below.

The controller 310 may obtain state information about the electronic device 100 (807). The process in which the controller 310 obtains the state information about the electronic device 100 corresponds to operation 709 of FIG. 7 and no repetitive description is thus given below. In this case, operation 807 may be performed before or (substantially) simultaneously with operation 805.

The controller 310 may obtain the location and moving speed of the electronic device 100 as the state information about the electronic device 100.

The controller 310 may determine whether it is required to transmit the location of the electronic device 100 (809).

In other words, the controller 310 may determine whether the location of the electronic device 100 which the user holds is required to be transmitted to an external device so as to secure the user's safety. Here, the external device may be an emergency management server (e.g., a disaster management server, a government server in the user's country, or a consulate server of the user's country) or an external terminal (e.g., a terminal of the user's acquaintance, or a rescuee's terminal).

For example, when the type of emergency, which is the result of analysis of the emergency message, is a class 1 situation, e.g., 'fire,' and the location of the electronic device 100 does not change during a predetermined time, the controller 310 may consider that the user of the electronic device 100 has been isolated by fire and determine that it is required to transmit the location of the electronic device 100 to an external device.

When the type of emergency is a class 1 situation, e.g., 'cloudburst,' the location of the electronic device 100 is a mountain or valley, and the moving speed of the electronic device 100 is a predetermined speed or more, the controller 310 may consider that the user of the electronic device 100 is in the emergency of being swept away and determine that it is required to transmit the location of the electronic device 100 to an external device.

Upon determining that it is required to transmit the location of the electronic device 100, the controller 310 may determine whether the user authorizes the transmission of location of the electronic device 100 (811).

The user's authorization to transmit the location may previously be designated by the user before the emergency occurs. Or, the user's authorization to transmit the location may be designated as default by the manufacturer of the electronic device 100, the provider of an application installed on the electronic device 100, or the provider of the operating system.

Or, the user's authorization to transmit the location may be designated by the user's setting after the emergency occurs. For example, upon determining that an emergency has occurred, the electronic device 100 may display a pop-up screen to inquire whether to transmit the location of the electronic device 100 to an external device. When the user's selection is entered to accept the transmission of location, the controller 310 may determine that the user has authorized the transmission of the location of the electronic device 100.

In this case, operation 811 may be performed before or (substantially) simultaneously with operation 809. In other words, the controller 310 may determine the user's authorization to transmit the location of the electronic device 100 to the external device and then determine whether it is required to transmit the location of the electronic device 100 to the external device.

Upon determining that the transmission of location of the electronic device 100 is required and that the user has authorized the transmission of the location of the electronic device 100, the controller 310 may transmit the location of the electronic device 100 to the external device (813). Here, the external device may be an emergency management server or an external terminal as set forth above.

In contrast, upon determining that the transmission of location of the electronic device 100 is not required or that the user has not authorized the transmission of the location of the electronic device 100, the display unit 340 may display the emergency information contained in the emergency message, as is, on the screen (815).

According to various embodiments, when the data roaming functionality of the electronic device 100 has been deactivated to prevent excessive use of data, the controller 310 may activate the data roaming functionality to transmit the location of the electronic device 100. For example, the data roaming functionality may be activated during a predetermined period, e.g., while the location information is transmitted or until such a message is received as to indicate that the disaster is released.

Figure 9C:
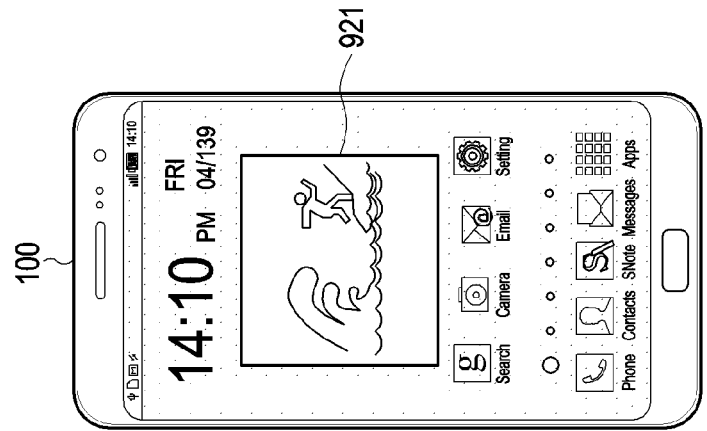
FIGS. 9A to 9C are views illustrating a screen of providing an emergency notification content according to an embodiment of the disclosure.
Figure 9B:
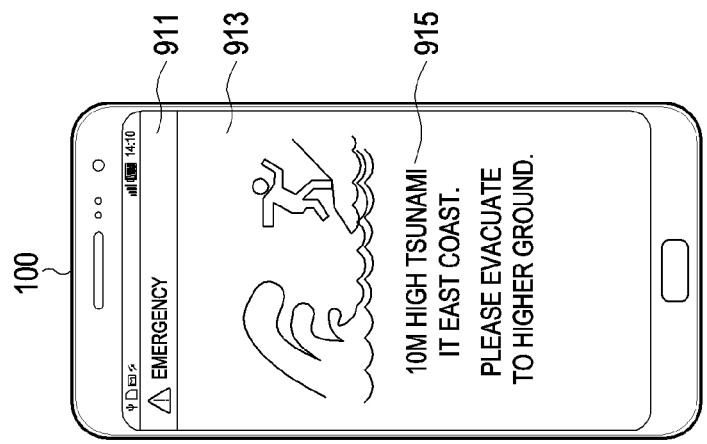
Figure 9A:
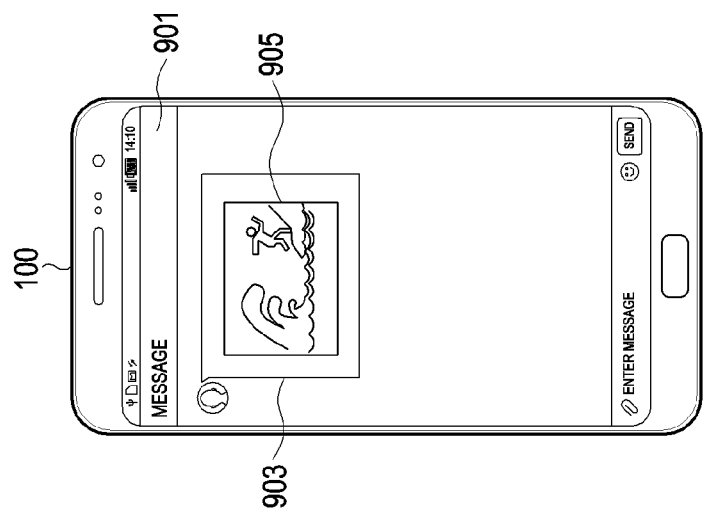

FIGS. 9A-9C are views illustrating a screen of providing an emergency notification content according to an embodiment of the disclosure.

Referring to FIGS. 9A-9C, the controller 310 may analyze a received emergency message, extract emergency-related information, and obtain an emergency notification content corresponding to the extracted emergency-related information. The display unit 340 may display the obtained emergency notification content on the screen.

The emergency notification content may be displayed through a message application execution screen 901 as shown in FIG. 9A. In this case, the emergency notification content 905 may be displayed, included in a message 903 that takes an emergency information provider server as the sender.

Or, the emergency notification content a be displayed through an execution screen 911 of an emergency notification-dedicated application which manages the emergency notification content as shown in FIG. 9B. In this case, emergency information 915 in the form of text which is contained in the emergency message, together with the emergency notification content 913 in the form of an image may be displayed. In this case, the content of the emergency information may be guide information to respond to emergency, such as, e.g., 'get under a desk,' 'evacuate to a higher ground,' or 'go out the building.'

According to various embodiments, the emergency notification content may be distinctively displayed in various colors depending on the type or priority of emergency. For example, when the emergency has a higher priority, the emergency notification content may be displayed in red and, in lower priority, in black. Or, when the emergency has a higher priority, the emergency notification content may be displayed in color and, in lower priority, in black-and-white. Or, when the emergency has a higher priority, the emergency notification content may be displayed in highlight (e.g., in brighter pixels or flickering) and, in lower priority, with no highlight. Or, when the type of emergency is a tsunami, the emergency notification content may be displayed in blue and, when a heat wave, in red, and when an earthquake, in yellow.

Figure 10:
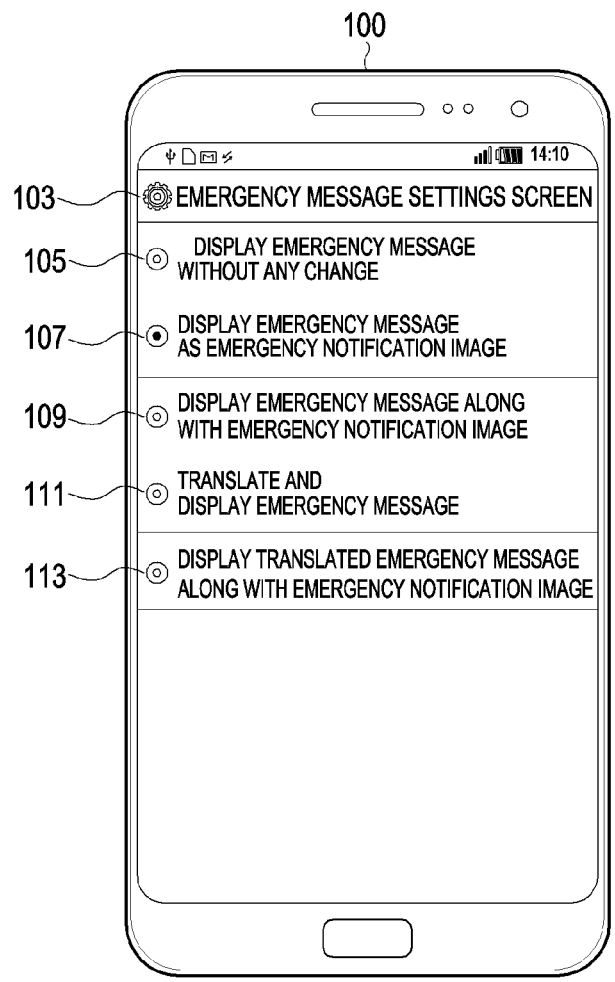
FIG. 10 is a view illustrating a screen for setting a display format of an emergency notification content according to an embodiment of the disclosure.

FIG. 10 is a view illustrating a screen for setting a display format of an emergency notification content according to an embodiment of the disclosure.

Referring to FIG. 10, the display unit 340 may provide a settings screen 101 including an interface to set up the format of display of an emergency message when the emergency message is received.

For example, the settings screen 103 may display at least one of an item 105 to display the emergency information contained in the emergency message without any change, an item 107 to convert the emergency message into an emergency notification image and display the emergency notification image according to an embodiment of the disclosure, an item 109 to display the emergency information contained in the emergency message along with the emergency notification image, an item 111 to translate the emergency information contained in the emergency message into the user language set in the electronic device 100, and an item 113 to display the emergency information contained in the translated emergency message along with the emergency notification image.

When the user selects one of the plurality of items through the settings screen 103, the electronic device 100 may provide the user with at least one of the emergency notification content and the emergency information according to the setting corresponding to the selected item upon receiving the emergency message.

Figure 11:
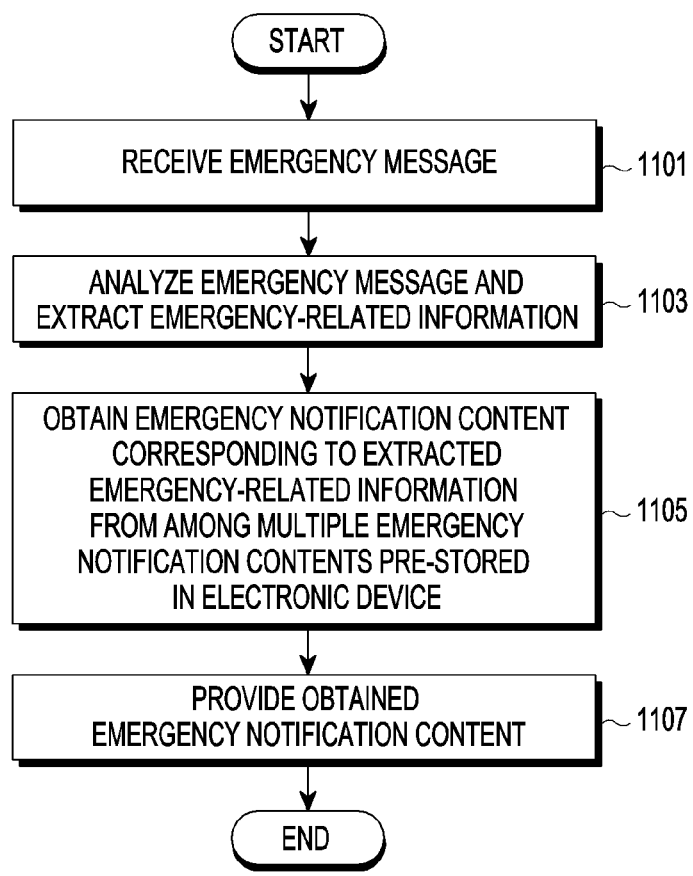
FIG. 11 is a flowchart illustrating a method of providing an emergency service according to an embodiment of the disclosure.

FIG. 11 is a flowchart illustrating an electronic device 100 to provide an emergency service according to an embodiment of the disclosure.

Referring to FIG. 11, the electronic device 100 may receive an emergency message (1101).

Next, the electronic device 100 may analyze the received emergency message and extract emergency-related information (1103).

Next, the electronic device 100 may obtain an emergency notification content corresponding to the extracted emergency-related information from among a plurality of emergency notification contents previously stored in the electronic device 100 (1105).

The electronic device 100 may provide the obtained emergency notification content (1107). For example, when the emergency notification content s an image or pictogram, the electronic device 100 may display the image or pictogram on the screen of the electronic device 100.

According to various embodiments, the electronic device 100 may analyze the emergency message and determine the language used in the emergency message. The electronic device 100 may determine whether the determined language is the same as or different from the user language set in the electronic device 100.

When the language used in the emergency message is determined to differ from the user language set n the electronic device 100, the electronic device 100 may obtain the emergency notification content corresponding to the emergency-related information extracted as per a result of analysis of the emergency message.

As another example, when the language used in the emergency message is determined to differ from the user language set in the electronic device 100, the electronic device 100 may translate the emergency information contained in the emergency message into the user language set in the electronic device. The electronic device 100 may display the translated emergency information on the screen.

As another example, when the language used in the emergency message is determined to be the same as the user language set in the electronic device 100, the electronic device 100 may display the emergency information contained in the emergency message, as is, on the screen.

According to various embodiments, the electronic device 100 may obtain state information about the electronic device 100. In this case, the electronic device 100 may obtain the emergency notification content corresponding to the emergency-related information based on the obtained state information and the emergency-related information extracted according to a result of analysis of the emergency message.

According to various embodiments, the electronic device 100 may obtain location information about the electronic device 100. In this case, the electronic device 100 may transmit the obtained location information about the electronic device 100 to an external device based on the obtained location information about the electronic device 100 and the emergency-related information extracted according to a result of analysis of the emergency message.

Figure 12:
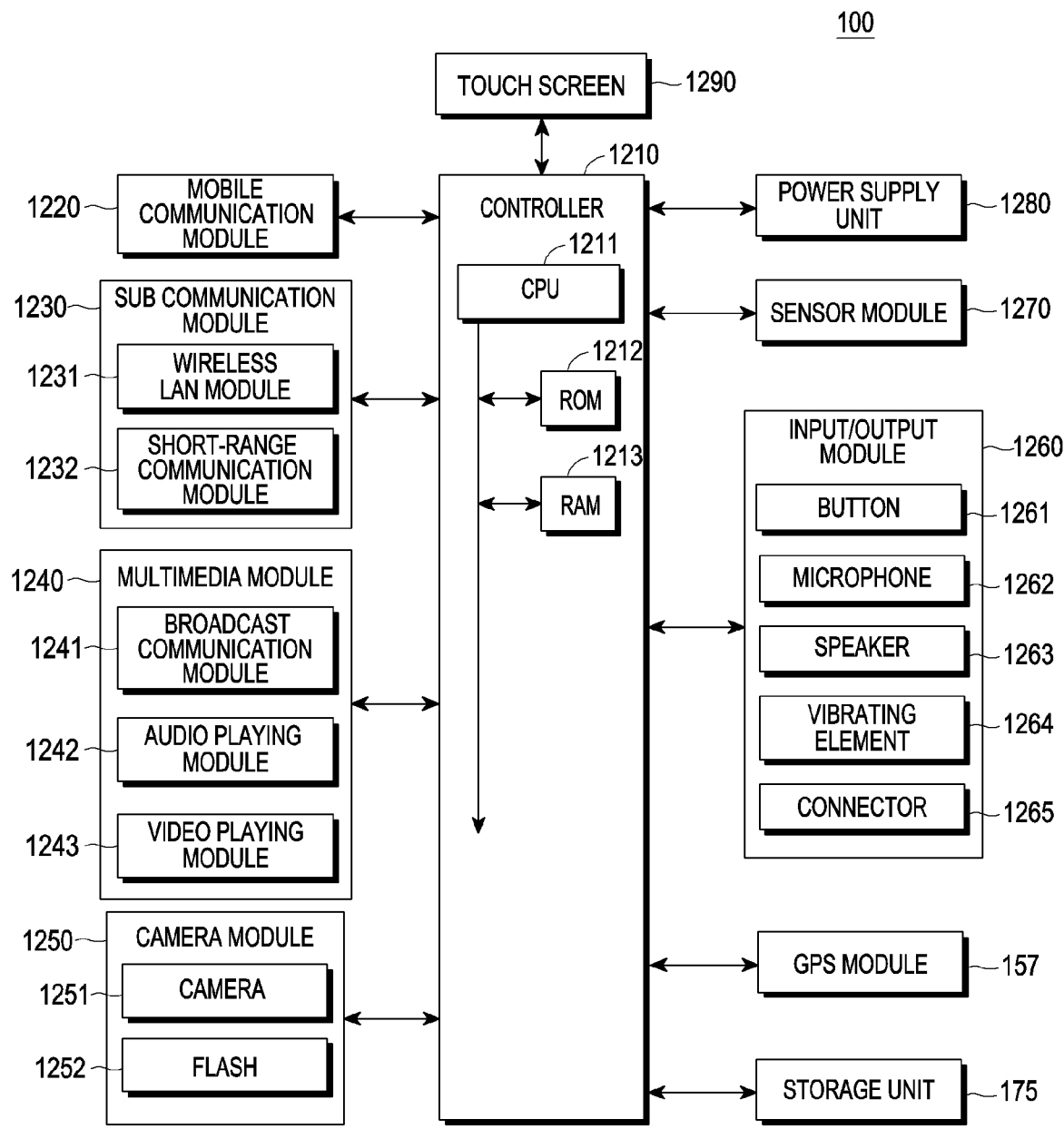
FIG. 12 is a block diagram illustrating a detailed structure of an electronic device according to an embodiment of the disclosure.

FIG. 12 is a block diagram illustrating a detailed structure of an electronic device 100 according to an embodiment of the disclosure.

Referring to FIG. 12, an electronic device 100 may include at least one or more of a controller 1210, a mobile communication module 1220, a sub communication module 1230, a multimedia module 1240, a camera module 1250, an input/output module 1260, a sensor module 1270, a storage unit 1275, a power supply unit 1280, and a touchscreen 1290.

Specifically, the electronic device 100 may connect to an external electronic device (not shown) using at least one of the mobile communication module 1220, a connector 1265, and an earphone connection jack (not shown). Further, the electronic device 100 may connect to other portable device or electronic device, e.g., a mobile phone, a smartphone, a tablet PC, a desktop PC, and a server, using a wired or wireless connection.

The communication module may include the mobile communication module 1220, the sub communication module 1230, and a broadcast communication module 1241. The sub communication module 1230 may include at least one of a wireless LAN module 1231 and a short-range communication module 1232. The multimedia module 1240 may include at least one of the broadcast communication module 1241, an audio playing module 1242, and a video playing module 1243. The camera module 1250 may include a camera 1250 and may further include a flash 1252. The input/output module 1260 may include at least one of a button 1261, a microphone 1262, a speaker 1263, a vibrating element 1264, and the connector 1265.

The controller 1210 may include a CPU 1211, a ROM 1212 retaining a control program for controlling the electronic device 100, and a RAM 1214 that is used to store signals or data input from the outside of the electronic device 100 or that is used as a storage area for tasks performed on the electronic device 100. The CPU 1211 may include a single core, a dual core, a triple core, or a quad core. The CPU 1211, the ROM 1212, and the RAM 1213 may be interconnected via an internal bus.

The controller 1210 may control at least one of the mobile communication module 1220, the multimedia module 1240, the camera module 1250, the input/output module 1260, the sensor module 1270, the storage unit 1275, the power supply unit 1280, and the touchscreen 1290.

At this time, according to an embodiment of the disclosure, the controller 1210 may analyze an emergency message received through the mobile communication module 1220, extract emergency-related information, obtain an emergency notification content corresponding to the extracted emergency-related information from among a plurality of emergency notification contents previously stored in the storage unit 1275, and display the obtained emergency notification content through the touchscreen 1290.

Further, the controller 1210 may detect the user's input event, such as a hovering event that occurs as the user approaches or moves close to the touchscreen 1290. The controller 1210 may detect various user inputs received through the camera module 1250, the input/output module 1260, and the sensor module 1270 as well as from the touchscreen 1290. The user inputs may include various forms of information entered to the electronic device 100, such as the user's gesture, speech, pupil movement, iris recognition, or biometric signals, as well as the touch. The controller 1210 may perform control so that a predetermined operation or function corresponding to the detected user input is carried out in the electronic device 100.

Further, the electronic device 100 may include at least one of the mobile communication module 1220, the wireless LAN module 1231, and the short-range communication module 1232 depending on its performance.

The mobile communication module 1220 may connect the electronic device 100 with the external electronic device through a mobile communication network using at least one or multiple antennas (not shown) under the control of the controller 1210. The mobile communication module 1220 may transmit or receive wireless signals for voice call, video call, short message service (SMS), or multimedia message (MMS) with a mobile phone (not shown), smartphone (not shown), tablet PC, or other electronic device (not shown) with the phone number entered to the electronic device 100. According to an embodiment of the disclosure, the electronic device 100 may receive an emergency message transmitted from an emergency information provider server through the mobile communication module 1220.

The sub communication module 1230 may include at least one of the wireless LAN module 1231 and the short-range communication module 1232. For example, the sub communication module 1230 may include the wireless LAN module 1231 alone, the short-range communication module 1232 alone, or both the wireless LAN module 1231 and the short-range communication module 1232.

The wireless LAN module 1231 may connect to the Internet in the place where an AP has been installed under the control of the controller 1210. The wireless LAN module 1231 may support the wireless LAN standards (IEEE 802.11x) of the Institute of Electrical and Electronics Engineers (IEEE). The short-range communication module 1232 may perform short-range wireless communication between the electronic device 100 and the external electronic device under the control of the controller 1210. The short-range communication schemes may include Bluetooth, infrared communication, Wi-Fi-direct communication, or NFC.

The broadcast communication module 1241 may receive broadcast signals (e.g., TV broadcast signals, radio broadcast signals, or data broadcast signals) and broadcast additional information (e.g., electronic program guide (EPG) or electronic service guide (ESG)) from broadcast stations through a broadcast communication antenna. (not shown) under the control of the controller 1210.

The multimedia module 1240 may include the audio playing module 1242 and the video playing module 1243. The audio playing module 1242 may play digital audio files (e.g., files with mp3, wma, ogg, or wave as extensions) stored in the storage unit 127 or received under the control of the controller 1210. The video playing module 1243 may play digital video files (e.g., files with mpeg, mpg, mp4, avi, mov, or mkv as extensions) stored or received under the control of the controller 1210. The multimedia module 1240 may be integrated with the controller 1210.

The camera module 1250 may capture a still image, video, or panoramic picture under the control of the controller 1210. The camera module 1250 may further include a flash 1252 to serve as an assistant light source necessary to take a picture of an object. When the camera module 1250 includes a plurality of cameras 1251, a first camera may be disposed on the front surface of the electronic device 100, and a second camera may be disposed on the rear surface of the electronic device 100.

The input/output module 1260 may include at least one of at least one button 1261, at least one microphone 1262, at least one speaker 1263, at least one vibrating element 1264, and the connector 1265. The input/output module 1260 is not limited thereto but may rather include a mouse, track ball, joystick, cursor keys, or other cursor controls to control the movement of the cursor on the touchscreen 1290.

The button 1261 may be formed on the front, side, or rear surface of the housing (or casing) of the electronic device 100 and may include at least one of a power/lock button, volume buttons, menu button, home button, back button, and search button. The microphone 1262 may receive a voice or sound to generate an electrical signal under the control of the controller 1210. The speaker 1263 may output sounds corresponding to various signals or data (e.g., wireless data, broadcast data, digital audio data, or digital video data) to the outside of the electronic device 100 under the control of the controller 1210. The speaker 1263 may output sounds (e.g., button control sounds, ring tones, or the other party's voice) corresponding to the functions of the electronic device 100. One or more speakers 1263 may be formed in one or more positions of the housing of the electronic device 100.

The vibrating element 1264 may convert electrical signals into mechanical vibrations under the control of the controller 1210. For example, upon receiving a voice or video call from another device (not shown), the vibrating element 1264 operates in the electronic device 100 which is in a vibration mode. One or more vibrating elements 1264 may be formed in the housing of the electronic device 100. The vibrating element 1264 may operate corresponding to the user's input to the touchscreen 1290.

The connector 1265 may be used as an interface to connect the electronic device 100 with an external electronic device or a power source (not shown). The controller 1210 may transmit data stored in the storage unit 1275 to the external electronic device or receive data from the external electronic device via a wire cable connected to the connector 1265. The electronic device 100 may receive power from a power source or charge a battery (not shown) using the power source via the wire cable connected to the connector 1265.

The sensor module 1270 includes at least one sensor for detecting the state of the electronic device 100. For example, the sensor module 1270 may include at least one sensor, such as a proximity sensor for detecting the user's approach to the electronic device 100, an illumination sensor (not shown) for detecting the amount of light around the electronic device 100, a motion sensor (not shown) for detecting the motion of the electronic device 100 (e.g., rotation, acceleration or vibration of the electronic device 100), a geomagnetic sensor for detecting the point of the compass of the electronic device 100 using the geomagnetic field, a gravity sensor for detecting the direction where the gravity works, an altimeter for detecting an altitude by measuring the atmosphere pressure, or a GPS module 1257.

The GPS module 1257 may receive radio waves from a plurality of GPS satellites (not shown) orbiting the Earth and calculate the position of the electronic device 100 using the time of arrival of the radio waves from the GPS satellites to the electronic device 100.

The storage unit 1275 may store signals or data input/output according to operation of the mobile communication module 1220, multimedia module 1240, camera module 1250, input/output module 1260, sensor module 1270, or touchscreen 1290 under the control of the controller 1210.

The storage unit 1275 may store a control program to control the electronic device 100 or the controller 1210 and applications. One of the control program or the applications may be an application able to display emergency notification contents or an application able to translate emergency information contained in emergency messages according to an embodiment of the disclosure.

The term "storage unit" may refer to any data storage device, e.g., a memory card (e.g., an SD card or Memory stick) mounted in the electronic device 100, a ROM 1212 or RAM 1213 in the controller 1210, or the storage unit 1275. The storage unit 1275 may include a non-volatile memory, a volatile memory, a hard disk drive (MD) or a solid state drive (SSD).

Further, the storage unit 1275 may store applications of various functions, such as navigation, video call, game, or time-based alarm applications, images for providing graphical user interfaces (GUI) related thereto, databases or data related to methods for processing user information, documents, or touch inputs, operating programs or background images (e.g., menu screen or idle screen) necessary for driving the electronic device 100, and images captured by the camera module 1250.

The storage unit 1275 may be a machine-readable (e.g., computer-readable) medium. The term "machine-readable medium" may be defined as a medium that provides data by the machine to allow the machine to perform a particular function. Further, the storage unit 1275 may include a non-volatile medium and a volatile medium. All the media may be of such a type to enable commands transferred by the media to be detected by the machine-readable physical mechanism.

The machine-readable media include, but is not limited to, at least one of floppy disks, flexible disks, hard disks, magnetic tapes, CD-ROMs, optical discs, punch cards, paper tapes, RAMs, PROMs, EPROMs, FLASH-EPROMs, and embedded multimedia cards (eMMCs).

The power supply unit 1280 may supply power to one or more batteries disposed in the housing of the electronic device 100 under the control of the controller 1210. One or more batteries supply power to the electronic device 100. The power supply unit 1280 may supply power which is input from an external power source via a wire cable connected with the connector 1265 to the electronic device 100. The power supply unit 1280 may supply power which is wirelessly input from an external power source through wireless charging technology to the electronic device 100.

The electronic device 100 may include at least one touchscreen 1290 that provides user graphic interfaces corresponding to various services (e.g., call, data transmission, broadcast, or photographing) to the user.

The touchscreen 1290 may receive at least one user input through the user's body part (e.g., his thumb or other finger) or an input unit (e.g., a stylus pen or electronic pen). The touchscreen 1290 may be implemented, e.g., in a resistive, capacitive, infrared, or acoustic wave manner, or in a combination thereof.

The touchscreen 1290 may include at least two touch panels capable of detecting a touch or approach of a finger and an input unit to receive an input by each of the finger and the input unit.

The touch is not limited to a contact of the user's body or a touchable input means to the touchscreen 1290 but may rather include a non-contact (e.g., a detectable gap of 5 mm or less between the touchscreen 1290 and the user's body or touchable input means). The gap detectable on the touchscreen 1290 may be varied depending on the performance or structure of the electronic device 100.

A touch controller (not shown) included in the touchscreen 1290 converts analog signals input to the touchscreen 1290 into digital signals and transmits the digital signals to the controller 1210. The controller 1210 may control the touchscreen 1290 using the received digital signals. The touchscreen controller (not shown) may identify a hovering interval or distance as well as the position of the user input by detecting a value (e.g., a current value) output according to the user input and may convert the identified distance value into a digital signal (e.g., a Z axis) and provide the digital signal to the controller 1210. The touchscreen controller (not shown) may detect the pressure of the user input means to the touchscreen 1290 by detecting a value (e.g., a current value) output according to the user input and may convert the identified pressure value into a digital signal and provide the digital signal to the controller 1210.

According to an embodiment of the disclosure, at least part of the electronic device (e.g., modules or their functions) or method (e.g., operations) may be implemented as instructions stored in a computer-readable non-transitory recording medium in the form of a program module. The instructions, when executed by a processor, may allow the processor to carry out functions corresponding to the instructions.

Here, the program may be stored in a computer-readable non-transitory recording medium and read out and run by the computer to implement the embodiments of the disclosure.

Here, the non-transitory recording medium may include a medium capable of semi-permanently storing data and being read out by a machine as well as a volatile or non-volatile memory temporarily storing data for computation or transmission purposes, such as a register, cache, or buffer. In contrast, transitory transmission media, such as signals or current do not correspond to the non-transitory recording medium.

Specifically, the above-described programs may be stored and provided in a non-transitory readable recording medium, such as a CD, DVD, hard disk, Blu-ray disc, USB, embedded memory, memory card, ROM or RAM.

Further, the above-described programs may be stored in a memory of a server and be transmitted for sale to a terminal connected to the server via a network or registered in the server by the sellers of the programs.

According to an embodiment, a computer-readable non-transitory recording medium may store a program to enable an electronic device to perform the operation of receiving an emergency message, the operations of analyzing the received emergency message and extracting emergency-related information, the operation of obtaining an emergency notification content corresponding to the extracted emergency-related information from among a plurality of emergency notification contents previously stored in the electronic device, and the operation of providing the obtained emergency notification content.

While embodiments of the disclosure have been shown and described above, it should be noted that the present disclosure is not limited to the particular embodiments described above and that various modifications may be made thereto by one of ordinary skill in the art to which the disclosure pertains without departing from the gist of the disclosure claimed in the claims and such modifications should not be individually appreciated from the technical spirit or aspects of the disclosure.

100: electronic device
310: controller
320: communication unit
330: storage unit
340: display unit

The invention claimed is:

1. A method of providing an emergency service by an electronic device, the method comprising:
receiving an emergency message including a text;
obtaining emergency-related information from the received emergency message;
obtaining an emergency notification content based on the obtained emergency-related information from among a plurality of emergency notification contents stored;
determining whether a language of the text in the emergency message is the same as a language configured in the electronic device;
displaying the obtained emergency notification content in case that the language of the text is the same as the language configured in the electronic device; and
translating the text in the emergency message into the language configured in the electronic device and displaying at least one of the obtained emergency notification content or the translated text, in case that the language of the text differs from the language configured in the electronic device.

2. The method of claim 1, wherein the emergency message is received from a commercial mobile alert system (CMAS) system or an earthquake and tsunami warning system (ETWS) system through a base station or a relay device according to a mobile communication protocol.

3. The method of claim 1, wherein the emergency-related information is an identifier indicating a type of emergency or an emergency-related keyword contained in the emergency message.

4. The method of claim 1, wherein the providing the obtained emergency notification content comprises:
when the obtained emergency notification content is an image or a pictogram, displaying the image or the pictogram on a screen of the electronic device.

5. The method of claim 1, further comprising;
obtaining state information about the electronic device,
wherein the obtaining the emergency notification content comprises:
obtaining the emergency notification content based on the obtained emergency-related information from among the plurality of emergency notification contents stored in the electronic device based on the obtained emergency-related information and the obtained state information about the electronic device.

6. The method of claim 1, further comprising;
obtaining location information or ambient information about the electronic device;
determining whether to transmit the obtained location information or ambient information to an external device based on the obtained emergency-related information and the obtained location information about the electronic device; and
transmitting the obtained location information or ambient information in case that it is determined to transmit the obtained location information or ambient information.

7. An electronic device configured to provide an emergency service, the electronic device comprising:
a display unit;
a storage unit configured to store a plurality of emergency notification contents;
a communication unit configured to receive an emergency message including a text; and
a controller configured to:
obtain emergency-related information from the received emergency message,
obtain an emergency notification content based on the obtained emergency-related information from among the plurality of emergency notification contents stored in the storage unit,
determine whether a language of the text in the emergency message is the same as a language configured in the electronic device,
display the obtained emergency notification content in case that the language of the text is the same as the language configured in the electronic device, and
translate the text in the emergency message into the language configured in the electronic device and display at least one of the obtained emergency notification content or the translated text, in case that the language of the text differs from the language configured in the electronic device.

8. The electronic device of claim 7, wherein the emergency message is received from a commercial mobile alert system (CMAS) system or an earthquake and tsunami warning system (ETWS) system through a base station or a relay device according to a mobile communication protocol.

9. The electronic device of claim 7, wherein the emergency-related information is an identifier indicating a type of emergency or an emergency-related keyword contained in the emergency message.

10. The electronic device of claim 7, wherein when the obtained emergency notification content is an image or a pictogram, the controller is further configured to display the image or the pictogram on the display unit.

11. The electronic device of claim 7, wherein the controller is further configured to obtain state information about the electronic device and obtain the emergency notification content based on the obtained emergency-related information from among the plurality of emergency notification contents stored in the electronic device based on the obtained emergency-related information and the obtained state information about the electronic device.

12. The electronic device of claim 7, wherein the controller is further configured to:
- obtain location information or ambient information about the electronic device;
- determine whether to transmit the obtained location information or ambient information to an external device based on the obtained emergency-related information and the obtained location information about the electronic device; and
- transmit the obtained location information or ambient information in case that it is determined to transmit the obtained location information or ambient information.

* * * * *